Figure 1:
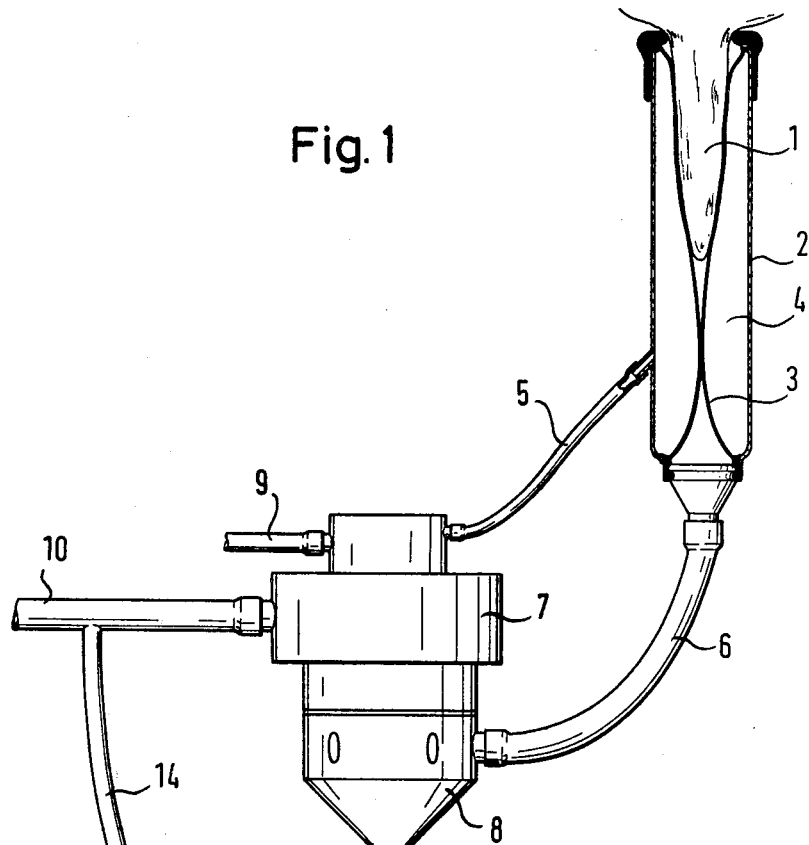

United States Patent [19]

Happel

[11] 4,200,058
[45] Apr. 29, 1980

[54] METHOD AND APPARATUS FOR MACHINE MILKING

[76] Inventor: Fritz Happel, 8951 Baisweil 24, Fed. Rep. of Germany

[21] Appl. No.: 903,364

[22] Filed: May 5, 1978

[30] Foreign Application Priority Data

May 9, 1977 [DE] Fed. Rep. of Germany ....... 2720856

[51] Int. Cl.² .............................. A01J 5/04; A01J 5/10
[52] U.S. Cl. .............................. 119/14.01; 119/14.29; 119/14.31; 119/14.51; 119/14.52
[58] Field of Search ............... 119/14.01, 14.02, 14.29, 119/14.3, 14.31, 14.32, 14.33, 14.34, 14.35, 14.36, 14.38, 14.39, 14.4, 14.41, 14.44, 14.52, 14.51

[56] References Cited

U.S. PATENT DOCUMENTS

| 904,564 | 11/1908 | Ripczinske | 119/14.52 |
|---|---|---|---|
| 1,089,839 | 3/1914 | Hulbert | 119/14.02 |
| 2,340,296 | 2/1944 | Bender | 119/14.02 |
| 3,077,180 | 2/1963 | Hagg et al. | 119/14.01 |

*Primary Examiner*—Hugh R. Chamblee
*Attorney, Agent, or Firm*—Townsend and Townsend

[57] ABSTRACT

Milking is carried out using milking cups each having a teat rubber liner in which the teat is received. Pressure is periodically applied to the outside of the liner to massage the teat and suction is applied to the milk discharge duct so that the milk is discharged therefrom. A valve in the milk discharge duct in the form of a section of rubber hose has a relatively more elastic zone on its surface and sits in a housing to which pressure is periodically applied during the massage pulse so that the elastic zone is indented to close at least the milk free cross section of the hose. The teats are thus periodically isolated from vacuum which is kinder to the teats and prevents reverse washing effects during the massage phase. In modifications the valve is placed at the end of the teat rubber and a series of massage cushions are used to sequentially massage the teat.

16 Claims, 3 Drawing Figures

METHOD AND APPARATUS FOR MACHINE MILKING

The invention relates to a method and apparatus for machine milking by means of milking cups and has particular reference to milking cups in which an internal chamber is defined by an elastic teat rubber for receiving the teat of an animal. Milking is effected using such milking cups by connecting the internal chamber to a low pressure source and periodically applying varying pressures to the outside of the teat rubber. During the so called suction pulse i.e. when the pressure in the internal chamber is less than the pressure on the outside of the teat rubber, and this pressure is also less than atmospheric milk is extracted from the teat. During a sequential massage pulse the pressure on the outside of the teat rubber rises above atmospheric pressure collapses the teat rubber around the teat and massages it. The massage pulse also extracts some further milk from the teat but the amount is small in comparison with that extracted during the suction pulse.

A disadvantage of known methods and apparatus is that the cylindrical teat rubber does not allow the teat to be isolated from the low pressure source and also that the massaging forces transmittable via the teat rubber are limited. These disadvantages have among other things the consequence that an optimum discharge of milk from the teat is not obtained. Thus is partly due to the vacuum continuously applied to the tip of the teat and partly to the insufficient massage, and support of the teat. This also results in the further disadvantage that good blood circulation in the teat is not promoted by the milking process. Another significant disadvantage associated with some known milking procedures is that a pumping effect occurs due to the continuously alternating opening and collapsing of the internal chamber of the teat rubber, and also of the attached milk discharge duct, which has the consequence that the milk cannot continuously flow away but rather is pumped back upwardly in the direction of the teat and is washed against the tip of the teat. This results in inefficient milking especially with large milk flows.

The object of the invention is to provide a machine milking method and apparatus therefore which on the one hand brings about a release of the teat by isolation from the low pressure source during the discharge pulse and which on the other hand guarantees a trouble free outflow of milk with the most extensive avoidance of reverse washing effects; furthermore, improvements in the invention seek to bring about an improved massaging of the teats which in combination with the desired complete release of the teat improves the blood circulation in the teat and is generally much kinder to the teat.

According to the present invention there is provided a method of machine milking comprising the steps of inserting the teat of an animal into a chamber defined within a resilient liner and connected to a milk discharge duct, periodically applying pressure to the outside of said liner to periodically massage said teat, periodically applying a control pressure to a valve in said milk discharge duct to periodically close at least the cross-section of the duct not filled with milk during at least a portion of the massage pulse said valve comprising a relatively more elastic zone of the surface of said milk discharge duct extending partially around the duct, and having a chamber surrounding said zone to which said periodically applied control pressure is admitted to produce an indentation of the elastic zone.

Also according to the present invention there is provided apparatus for machine milking comprising a resilient generally cylindrical liner defining an internal chamber for receiving a teat of an animal, a milk discharge duct connected to said internal chamber, means for applying periodically varying pressure to the outside of said liner to periodically massage said teat and means for applying suction to the milk discharge duct to produce a pulse discharge of milk therefrom, there being further provided said valve in said milk discharge duct and means for periodically applying said control pressure to said valve to substantially isolate the teat from said suction for at least a portion of the time during which the teat is being massaged.

The invention thus makes is possible to substantially isolate the teat from low pressure during the massage pulse by enabling the flow cross section of the milk discharge duct to be controllably restricted, in the sense of reducing the low cross section of the duct to a size necessary to carry solely the milk flowing through the duct or by selecting a predetermined higher control pressure, to completely close the flow of the duct. In practice it is especially the case of closing of the liquid free cross section that is of especial significance, because this special case can be achieved simply and without trouble by producing a longitudinal tension of the relatively more elastic zone on account of the compulsorily prevailing differential pressure conditions set up in dependence on the milk flow. By the simultaneous isolation of the milk cup internal chamber from the low pressure source it is possible to maintain a milking process which is considerate and kind to the teats without producing reverse washing effects even during the discharge phase of the milk extraction.

The switching over of the milking cup intermediate chamber from the massage pulse to the suction pulse can usefully be delayed, with reference to the time of opening of the closure brought about by the indentation, in order to achieve an extensive support of the teat by the teat rubber at the moment at which the low pressure is once more applied to the tip of the teat.

A preferred apparatus for carrying out the method of the invention is characterized in that an essentially cylindrical hose section is provided as the closure valve and has a control wall, in the form of a relatively more elastic zone, which extends essentially over the axial length of the hose section and up to at most half of the periphery of the hose section and which is indentable from one side against a positive abutment by producing a differential pressure across the two sides of the control wall.

Preferably the hose section is arranged in a rigid cylindrical housing and is connected at its end regions to the wall of housing there being a pressure connection in the wall of the housing in the vicinity of the indentable control wall.

This surprisingly simple measure of using a hose section which is positively indentable from one side i.e. a hose section of which one half of the periphery forms an immovable reception zone and the other half of which acts in practise as an elastic membrane positively impressable into the reception zone, means a closure valve is obtained which, in dependence on the external control pressure, makes possible either the complete or the partial closure of the fluid flow cross section of the milk discharge duct. This complete or partial closure can be achieved in a simple manner, and the closure valve can be readily cleaned without problem.

The resetting of the control wall takes place practically on its own on removal of the control pressure because the longitudinal tension that is provided in the relatively more elastic zone is sufficient to guarantee the resetting movement.

The invention further comprises an apparatus in which the described closure which operates on the principle of differential pressure is arranged in the milking cup and is combined with a massage arrangement comprising at least two pressure cushions provided adjacent the teat rubber which at least partially surround the teat, are arranged one above the other, and are connected with one another via at least one restrictor opening, and that the internal space of the uppermost cushion is connectable to a source which periodically generates the differential pressure. If two chamber milking cups are used the pressure cushions are arranged in the intermediate chamber.

Through the control of the cushions which becomes effective during the massage pulse it is possible to improve the milk extraction and, with the most extensive regard for the teat, to achieve an optimal resemblance of the natural sucking of a calf.

The restrictor openings provided between the individual massaging cushions, which solely engage the teats over a part of the teat periphery enable a defined timewise staggered rise in pressure which is not only comparable with the extraction process in the direction of the tips of the teats which occurs during hand milking and especially during sucking of calves, but also as a consequence of the reverse process occuring during pressure reduction in the cushions brings about a pressure force directed from the tip of the teat to the base of the teat whilst simultaneously supporting the tip of the teat so that the blood circulation can be maintained without problem and an optimal stable positioning of the teat during the whole milking process results.

In the case of a two chamber milking cup the intermediate space opposite to the pressure cushions is usefully taken up by a filling body which fulfils the function of a support or an abutment and which preferably has a bulge in the vicinity of the uppermost pressure cushion which together with the counter pressure of this cushion brings about a shutting off of the teat from the udder such as is present both with hand milking and also with the sucking of a calf.

The principle of the present invention can be used with little problem in connection with single chamber cups which are generally of rigid construction but which however are elastically constructed in the vicinity of the massage cushion which is connected to the outside of the cup.

It is furthermore advantageous if a comparatively thinner resilient liner or teat rubber is used in combination with the massage cushions because this teat rubber does not have to directly supply any force necessary for massaging the teat, such as is the case with teat rubbers which are pressed together on account of differential pressure beneath the tip of the teat.

In order to achieve an especially fast and effective increase in the volume of the pressure cushions, these cushions can be at least partly of bellows like construction. It should also be mentioned that the massage cushions can also take over the function of holding the milking cup onto the teat during the massage stroke and thus no securing problems arise in this respect.

Figure 2:
Figure 3:
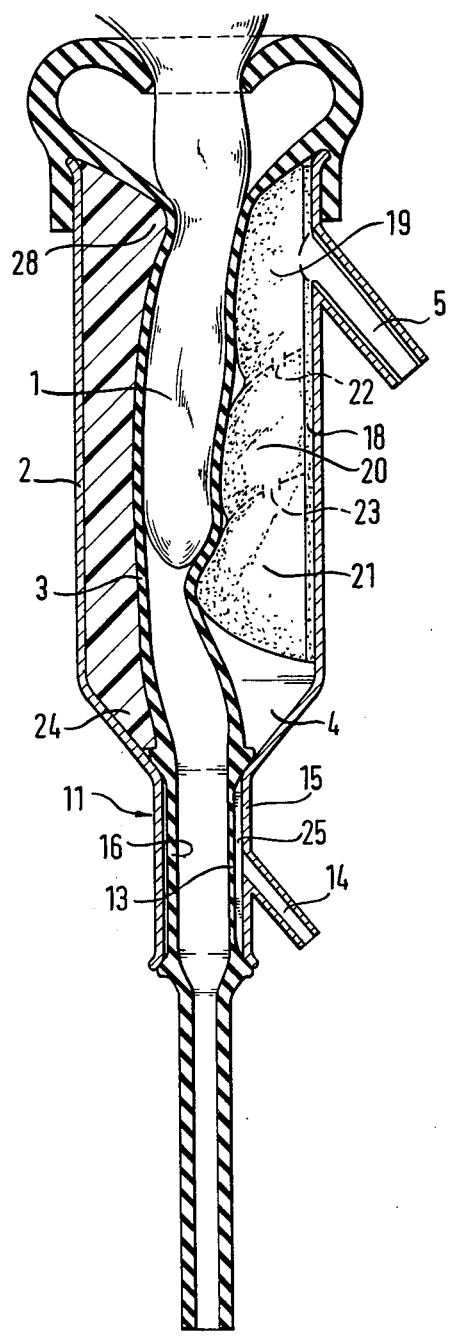

The invention will now be described in more detail with reference to exemplary embodiments and with reference to the drawings, in the drawings are shown:

FIG. 1 a schematic illustration of a first embodiment,

FIG. 2 a schematic cross sectional view of the valve of FIG. 1,

FIG. 3 a schematic sectional illustration of an alternative milking cup.

FIG. 1 shows a schematic view of a milking machine in which it is assumed that the milking apparatus is in the massaging pulse during which the teat 1 which is in the milking cup 2 is being squeezed, or massaged, by a resilient liner in the form of a teat rubber 3 on account of the pressure difference prevailing between the teat rubber internal chamber and the milking cup intermediate chamber 4.

The milking cup is connected with a control device 7 via a connection duct 5 and also via a milk discharge duct 6. The control device has a milk collecting chamber 8 into which milk flows from the milk discharge duct before being led of from the chamber by the second milk discharge duct 12. This part of the device is subjected to suction applied via milk discharge duct 12 and varied by the closure valve 11. The control device 7 receives periodic pulses of air pressure/suction from a pulsator 10 (not shown) and uses these as control pulses to open a valve (also not shown) to admit air pressure from the supply duct 9 or partial vacuum from the pulsator via the duct 5 to the intermediate chamber 4 between the outside of the liner 3 and milking cup 2. Of course in practice four milking cups (or eight if two animals are to be simultaneously milked are connected to a single control device.

In accordance with the present teaching a closure valve 11 is positioned in the milk duct 12 leading away from the collection chamber 8. The valve comprises a relatively more elastic zone of the wall of the milk discharge duct and is periodically loaded with pressure via a duct 14 from the pulsator duct 10.

The closure valve 11 makes it possible to separate the duct 12 which is at a low pressure from the collecting chamber i.e. the inner chamber of the milking cup, this is for example possible because a correspondingly higher control pressure than prevails in the milk discharge duct is applied via the control connection 14 in order to completely close the flow section or—and this illustrates the prefered embodiment—to restrict the flow cross-section by closing of that part of the flow cross-section through which no milk flows. This closing of the flow cross section which is free of milk likewise leads to a separation of the internal chamber of the milking cup from the low pressure source and takes place through indentation of the control wall in correspondence with the low pressure prevailing in the flow direction beneath the location of the indentation. When the entire cross-section is not filled with the milk flow a vacuum is still applied to the control wall 13 beneath the closure and the pressure difference of the fluid free region beneath the closure and the external side of the control wall 13 brings about the desired closure which in advantageous manner makes possible on the one hand a separation of the inner chamber of the milking cup from the low pressure source and on the other hand a simultaneous drawing off of the milk and indeed of different quantities of milk.

It is to be emphasized that the closure valve 11 does not have of necessity to be connected to the control device but rather than the closure valve can lie between the control member and the milking cup and indeed also in the milking cup itself, this will be later explained with reference to FIG. 3.

Because of the control of the closure 11 in dependence on the quantity of milk flowing, reverse flow effects which can be brought about by the pumping effect of the teat rubber are practically eliminated so that the milk extraction in the suction and in the massage pulses is significantly improved, the milking process is accelerated and the securing of a milking cup to the teat is improved.

FIG. 2 shows in section an embodiment of the closure valve 11. This closure valve comprises a section of hose, for example of rubber, which is fastened inside a housing 15 having a control connection 14. The arrangement is such that a relatively more elastic zone 13 of the peripheral wall, which acts as a control wall, is indentable on the occurence of a pressure difference across the two sides of the zone such as is produced by connecting connector 14 to pressure pulses in the duct 10.

The chamber formed between the housing and the zone is closed by sealingly connecting the control wall 13 to the ends of the housing. A degree of axial pretension is applied to this control wall which assists it in springing back to open the flow cross section when the milk flow increases.

The opposing wall region 16 is preferably of thicker construction for the positive reception of the control wall 13, in order to provide distinct abutment conditions during the inversion of the control wall. Apart from this a curved sealing surface 17 is maintained in the vicinity of the transition from the control wall to the opposing wall over which the control wall 13 is tensioned during the identation thereof so that a complete closure of the cross section of the milk discharge duct can be achieved in a problem free manner. A longitudinal rib 25 provided on the housing 15 extends over the length of this housing and spaces the control wall from the housing so that the suction pulse is applied to the control wall over its entire surface area. The control wall is thus prevented from blocking off the pressure/suction connection 14 during the suction pulse which could otherwise prevent the control wall from returning to its reset position thus freeing the milk discharge duct so that suction can once more applied to be the teat.

In FIG. 2 various positions of the control wall are indicated. When the cross section is completely free the control wall has the position 13 and this position corresponds in practice to the suction pulse. If, in comparison with the lower pressure prevailing in the interior of the hose a comparatively higher pressure for example atmospheric pressure is applied via the control connection 14 an indentation effect at once occurs and the control wall passes next of all into the position 13' and finally into the completely sealed position 13" if either no milk flow is present, or if the control pressure is relatively higher.

On taking into account the illustrated function of the valve it is understandable that the actual closure position along the axis of the closure valve can move and that also during a complete closure the abutment area of the control wall on the trough like opposing wall can vary.

The principle explained with reference to FIGS. 1 and 2 of the pressure and especially the milk flow dependent isolation of the vacuum source from the internal chamber of the milk cup can be preferably used in connection with the milking cup illustrated in FIG. 3 although the described closure valve can also advantageously be used in many of the previously known apparatuses, so that they may also be used to carry out the method of the present teaching.

In FIG. 3 a cushion moulding 18 is introduced into the milking cup 2 which receives the teat 1 and comprises three massage cushions 19, 20 and 21 positioned one behind the other and each partially surrounding the periphery of the teat. The sequential operation of these cushions is achieved via restrictor openings 22 and 23 which guaratee that the cushions increase or reduce in volume one after the other in time series in a completely defined manner and thereby the teat is massaged by a generally downward movement of a pressure wave by an effect comparable with that of hand milking or calf sucking.

The space opposite to the massage cushions is usefully occupied by a filling or supporting body 24 in order to obtain the abutment necessary with conventional milking cups. It is especially advantageous to provide in the upper region of the filing body and opposite to the uppermost pressure cushion a bulge 28 by means of which an effective shutting off of the teat from the udder can be achieved during the mechanical milking phase. This effect can be reinforced by the construction of a fold in the uppermost pressure cushion (not shown).

The closure valve 11 described and illustrated earlier with reference to FIGS. 1 and 2 is shown in FIG. 3 integrated into the milk discharge duct from the teat rubber 3. In FIG. 3 the lower part of the cup 2 is reduced in size and forms the outer housing 15 for the closure valve 11. A pressure/suction connection 14 is provided exactly as per FIGS. 1 and 2.

At the transition from the teat rubber 3 into the milk discharge duct the teat rubber is sealed at a conical lip against the reduced diameter portion of the cup and the control wall of the hose section of the control valve is reduced in section and is thus relatively more elastic than the diametrically opposite wall of the hose section. A further conical lip at the downstream end of the hose section bears on a conically outwardly turned lip of the milking cup and cooperates with the other conical lip in sealing the space between the outer housing 15 and the hose section. A longitudinal rib 25 is once more provided as per FIG. 2.

The massage cushions 19, 20 and 21 are solely schematically illustrated in the drawing but are in practice however advantageously so arranged that they at least have a certain resilience of their own, i.e. so that after the suction pulse ends they expand to lightly squeeze the teat on account of their own resilience.

The milking cup is periodically subjected to pulses of pressure and suction via the connection duct 5 and indeed in such a way that at the beginning of the discharge pulse the uppermost cushion is firstly strongly enlarged in volume and preferably directed against the bulge 28 of the abutment so that an effective shutting off of the teat from the udder is achieved prior to the mechanical milking phase and a directed pressure running towards the tip of the teat is then exerted on the teat. This is achieved by the succeeding sequential pressure increase produced via the restrictor openings 22 and 23 in the subsequent cushions which causes the massage effect to work downwardly in the direction of the tip of the teat until finally the tip of the teat is supported and massaged by the lowermost massage cushion whilst in accordance with an especial feature of the present teaching the uppermost cushion is already reducing in pressure so that the blood circulation in the teat can be maintained. The supporting of the tip of the teat is maintained for a sufficient length of time by the uppermost massage cushion until the transition into the suction pulse is achieved because then the tip of the teat can be once more carefully released by the massage cushion and accordingly the vacuum does not suddenly bear on a large area of the tip of the teat.

The teat rubber used in this milking cup can be of relatively thin-walled construction because the entire massage function follows from the pressure cushions. The thin-walled teat rubber has the consequence that a desired matching of the rubber to the teat is made simpler and thus a gentle support of the teat during the entire milking process is favourably brought about in cooperation with the massage cushions.

These massage cushions make possible the efficient extraction of milk during the massaging phase on account of the chosen control, and it is especially advantageous in this connection to operate with the previously explained pressure dependent closure valve, because this closure valve also guarantees a problem free drawing off of the milk during the massage pulse.

The cleaning of the closure valve is especially simple because no corners or narrow parts are provided and thus in principle washing the closure valve through is sufficient to clean it.

We claim:

1. Apparatus for machine milking using milking cups, each cup including a generally cylindrical outer cup and a resilient generally cylindrical liner located within the cup and defining an internal chamber for receiving a teat of an animal, the internal chambers of the milking cups being connected via milk discharge duct means to a milk collector, the apparatus comprising: means for applying suction via the milk discharge duct means to remove milk from the teats, and means for periodically applying pressure to an outside of the liners to massage the teats, said last mentioned means comprising in respect of each milking cup at least two hollow cushions disposed one above the other and partially surrounding the liner, a support body disposed between the liner and the cup opposite to said cushions, an inlet duct connected to an interior of said first cushion for supplying said periodically varying pressure thereto, and a restrictor connecting the interior of said first cushion to an interior of said second cushion, whereby said second cushion is sequentially filled after said first cushion to promote sequential massaging of the teat by the cushions.

2. Apparatus according to claim 1 wherein the support body is provided with a bulge at its uppermost end, the bulge being cooperable with said uppermost cushion to secure said cup to said teat.

3. Apparatus according to claim 2 including a third cushion provided for each milking cup, an interior of the third cushion being connected via a further restrictor to the interior of the second cushion.

4. Apparatus for machine milking using milking cups in which each cup includes a resilient generally cylindrical liner defining an internal chamber for receiving a teat of an animal and in which internal chambers of the milking cups are connected via milk discharge duct means to a milk collector, the apparatus comprising: means for periodically applying pressure to an outside of the liners to massage the teats, means for applying suction via the milk discharge duct means to remove milk from the teats, and valve means in said milk discharge duct means for periodically closing at least the cross-section of the duct means not filled with milk during at least a portion of the massage pulse, said valve means being defined by a relatively more elastic zone of a surface of said milk discharge duct means which extends partially around the duct, a housing encircling the milk discharge duct means and defining a valve chamber surrounding said zone, means for periodically applying a control pressure to the valve chamber to produce an indentation of the elastic zone, the elastic zone being axially pre-tensioned along the length of the housing, and a longitudinal rib between the housing and the elastic zone of said milk discharge duct.

5. Apparatus according to claim 4 and wherein said valve means comprises an individual valve provided in respect of each milking cup and located in the milk discharge duct means leading from the internal chamber of said cup.

6. Apparatus according to claim 4 and wherein said milk discharge duct means is defined by individual ducts connecting each said milking cup to a milk collecting chamber and a further outlet duct from said milk collecting chamber leading to said milk collector, the valve means comprising a valve provided in the duct means between said milk collecting chamber and said milk collector.

7. Apparatus according to claim 4 and in which said valve means comprises a section of hose having connections at either end for joining it into the milk discharge duct.

8. Apparatus according to claim 4 and in which each said liner comprises a resilient rubber molding.

9. Apparatus for carrying out machine milking by means of milking cups, each cup including a resilient liner defining an internal chamber for receiving a teat of an animal, milk discharge conduit means connecting said internal chambers to a source of relatively low pressure, and valve means in said milk discharge conduit means, the valve means being operative to close the flow cross-section of the conduit means and comprising: at least one valve with a duct having a relatively more rigid wall portion extending around at least about ⅔ of the duct periphery, and a relatively more elastic wall zone adjoining said relatively rigid wall portion at two longitudinally oriented transition lines and extending over a remainder of the duct periphery, a housing surrounding the duct and defining a chamber adjacent the outer wall of said relatively more elastic zone, there being an inlet to said chamber and means for applying a periodically varying pressure to said chamber to produce indentation of said elastic zone, the transition lines defining curved sealing shoulders whereby, upon indentation of said relatively more elastic wall zone, the wall zone folds around said curved sealing shoulders and against an inside surface of the relatively more rigid wall portion to sealingly close said flow cross-section.

10. Apparatus according to claim 9 and wherein said milk discharge conduit means is defined by respective individual discharge conduits from each milking cup, and wherein a said valve is provided in each said milk discharge conduit.

11. Apparatus according to claim 10 and wherein each milking cup comprises a generally cylindrical outer cup housing, for receiving the associated resilient liner, and in which the cup housing further cooperates with a section of the duct at the discharge end of the liner to define said valve.

12. Apparatus according to claim 9 and wherein said milk discharge conduit means comprises an individual discharge conduit in respect of each said milking cup, and a single outlet conduit to which said individual milk discharge conduits are connected, and wherein said valve means comprises a valve provided in said single outlet conduit.

13. Apparatus according to claim 12 and wherein said individual milk discharge conduits are connected to a milk collecting chamber, and said single outlet conduit is connected to the outlet from said milk collecting chamber.

14. Apparatus according to claim 9 and wherein said relatively more elastic wall zone is axially pretensioned in the longitudinal direction of the duct.

15. Apparatus according to claim 9 and wherein a longitudinal rib is provided between said housing and said relatively more elastic wall zone.

16. Apparatus according to claim 9 and wherein said valve comprises a section of hose having connections at either end for joining it into its associated discharge conduit.

* * * * *